United States Patent
Perlman et al.

(10) Patent No.: US 6,912,205 B2
(45) Date of Patent: Jun. 28, 2005

(54) AUTOCONFIGURING IP ROUTERS

(75) Inventors: Radia J. Perlman, Sammamish, WA (US); Eric A. Guttman, Waibstadt G (DE)

(73) Assignee: Sun Microsystems, Inc., Santa Clara, CA (US)

( * ) Notice: Subject to any disclaimer, the term of this patent is extended or adjusted under 35 U.S.C. 154(b) by 972 days.

(21) Appl. No.: 09/727,223

(22) Filed: Nov. 30, 2000

(65) Prior Publication Data

US 2002/0101873 A1 Aug. 1, 2002

(51) Int. Cl.[7] ............................................. H04L 12/26
(52) U.S. Cl. ...................................... 370/254; 370/475
(58) Field of Search ............................. 370/254–258, 370/475, 389, 392, 395.52, 395.53, 395.54, 401, 471; 709/220, 223, 226, 221, 222

(56) References Cited

U.S. PATENT DOCUMENTS

| | | | |
|---|---|---|---|
| 5,398,242 A | | 3/1995 | Perlman ................... 370/85.13 |
| 5,835,725 A | * | 11/1998 | Chiang et al. ............... 709/228 |
| 6,578,086 B1 | * | 6/2003 | Regan et al. ................ 709/242 |
| 6,697,360 B1 | * | 2/2004 | Gai et al. .................... 370/389 |
| 6,789,104 B1 | * | 9/2004 | Yamaguchi et al. ......... 709/203 |
| 2002/0052960 A1 | * | 5/2002 | Trisno et al. ................ 709/226 |

OTHER PUBLICATIONS

Webopedia Definitions and Links, http://webopedia.internet.com/TERM/brouter.html.
Sidhu et al., "Inside Apple Talk", Second Edition, Chapters 1, 4 and 5, Addison–Wesley Publishing Company, Inc., 1990.
Troll, Ryan, "Automatically Choosing an IP Address in an Ad–Hoc IPv4 Network", IETF Dynamic Host Configuration WG, Internet Draft Document, Apr. 14, 1999.
Thompson, S., "IPv6 Stateless Address Autoconfiguration", IETF Network WG, RFC 2462, Dec. 1998.
Seifert, W.M., "Integrated routing (and bridging)," Local Computer Networks, 1989, Proceedings 14th Conference on, Minneapolis, MN, USA Oct. 10–12, 1989, IEEE Computer Society, pp. 270–277.

* cited by examiner

Primary Examiner—Melvin Marcelo
(74) Attorney, Agent, or Firm—Kudirka & Jobse, LLP

(57) ABSTRACT

In automatically configuring network-layer addresses for network nodes in a network region, a specified router on each link generates link number request messages for the link. An address-assigning node assigns a region-wise unique link number to each link identified in a request message, and returns link number assignment messages containing the assigned link numbers. Each specified router assigns the link number from a received link number assignment message to a field of the network-layer addresses of the nodes on the associated link. According to a variation of the method, each specified router self-selects a link number and communicates with the other specified routers to avoid conflicts. Each specified router receives messages from the other specified routers containing numbers selected as region-wise unique link numbers for other links. Each specified router stores the received link numbers in association with the respective links in a local database. To configure a link number for the local link, a specified router selects a candidate region-wise unique link number not already associated with another link in the local database, generates a message containing the selected number, and propagates the message within the network region. Each specified router monitors the messages to detect when another specified router has selected the same link number. When this occurs, the specified router evaluates a conflict-resolution criterion to determine which router is entitled to keep a duplicate link number, and selects a new link number if necessary.

37 Claims, 1 Drawing Sheet

AUTOCONFIGURING IP ROUTERS

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention is related to the field of data communications networks, and more particularly to techniques for configuring node addresses in Internet Protocol (IP) and other networks.

One task to be performed in managing data communications networks is assigning addresses to network nodes, a process also referred to as "configuring" addresses in the network. In particular, it is necessary to configure addresses used at the network layer, or layer 3, of network operation as described by the Open Systems Interconnect (OSI) communications model. At the network layer, message routing protocols are generally used to route messages among the network nodes. Network-layer addresses are used to uniquely identify the sources and destinations of messages, and devices known as, "routers" use these addresses to forward messages toward respective destination nodes.

Network layer addresses typically reflect network topology to at least some degree. For example, it is common to assign a block of network-layer addresses having a single "prefix" for exclusive use by nodes connected to a given single link, such as an Ethernet local-area network (LAN). Such a prefix may consist, for example, of some number of most significant bits of a 32-bit IP address. For example, the prefix for a given link may be a 3-byte value represented as 10.4.4. The full address of each node on the link is formed by concatenating the prefix with a node-specific least-significant part, such as a one-byte node number. Thus, the address for node number 122, for example, on the above link is 10.4.4.122. Network routers utilize the prefix portion of network addresses to forward messages within the network according to the routing protocol. The last router in a path requires the full address in order to identify a specific destination node on the destination link.

Because they reflect network topology, network layer addresses must be configured dynamically, in the context of a specific operational network. In this regard, network-layer addresses differ from layer-2 addresses, or link-layer addresses, which can be device-specific. An example of such layer-2 addresses are Ethernet media access control (MAC) addresses. Ethernet MAC addresses are 48 bits in length, and they are generally assigned to devices at manufacturing time. An administrative address-assigning authority is responsible for assigning Ethernet MAC addresses in a coherent fashion, specifically to ensure global uniqueness of assigned addresses.

Likewise, within a given network region in which a particular routing protocol is used, network-layer addresses must be unique to unambiguously identify the sources and destinations of messages. To satisfy this uniqueness requirement as well as the above-described topology requirements, the address configuration process has generally been carried out by a human network operator using network management tools. However, the manual configuring of network addresses can have undesirable drawbacks. The configuration process can be time-consuming and error-prone. For this reason, it is desirable to automate the configuring of network addresses as much as possible.

In U.S. Pat. No. 5,398,242 of Perlman, issued Mar. 14, 1995 and entitled "Automatically Configuring LAN Numbers", a technique is described for automatically assigning numbers to local area networks (LANs) in an extended network having several LANs connected together by bridges. The LAN numbers are used by the bridges to identify LANs in a source routing protocol. One bridge on each LAN becomes a "designated bridge" for the LAN. A central database is used to maintain respective associations between designated bridges and assigned LAN numbers. The designated bridge for a LAN obtains a LAN number by transmitting a request identifying the bridge and the bridge port to which the LAN is connected. In response, a "root" bridge selects a LAN number that has not been associated with another LAN, and includes it in a response message sent back to the requesting bridge. The bridge in turn transmits LAN number identification messages incorporating the LAN number to the other bridges on the LAN, which then use the LAN numbers in executing the source routing protocol.

While the above technique provides for automatic configuration of LAN numbers, it relies upon a single centralized resource, the root bridge in a spanning tree, for proper operation. Overhead processes are required for the selection and maintenance of the spanning tree. Moreover, the LAN numbers are used to form extended headers for layer 2 messages, and not for functions at layer 3 of network operation. It would be desirable to provide for automatic configuration of network-layer addresses, and to enable address configuration without requiring a centralized resource such as a root bridge.

BRIEF SUMMARY OF THE INVENTION

In accordance with the present invention, methods and apparatus for automatically configuring nodes in a network region with network-layer addresses are disclosed. In particular, one disclosed technique operates in a fully distributed manner, and thus avoids the drawbacks of a centralized approach.

For each node of a link in a multi-link network region, a link-wise unique node number is assigned to a first field of the network-layer address of the node. In one embodiment, the first field is a distinct 1-byte portion of a 4-byte IP address.

According to one disclosed method, a specified router on each link self-selects a link number for use by the nodes of the link in a second field of their IP addresses. The specified router communicates with specified routers of other links to ensure that the selected number is used to identify only one link in a network region. The specified router on a link is a router that has been selected to perform certain communications and other functions on behalf of the link in the auto-configuration process. A request message is generated at each specified router and propagated within the network region using for example a multicast address. The request message identifies the associated link uniquely within the network region. For example, the request message may include a link name formed in part using the unique layer-2 address of the specified router.

Each request message also contains a number selected by a specified router to be used as a region-wise unique link number for the associated link. Each specified router receives the request messages from the other specified routers, and stores the received link numbers in association with the respective links in a local database. To configure a link number for use by the local link, a specified router selects a number as a candidate region-wise unique link number for the link, the number being selected from among those not already associated with another link in the local database. The specified router then generates the previously-described request message containing the selected number, and propagates the message within the network region for receipt by the other specified routers.

Each specified router continually monitors the messages received from the other specified routers to determine if another specified router has selected the same number for use as a region-wise unique link number. If a received message indicates that this has occurred, then the receiving specified router evaluates a conflict-resolution criterion to determine which specified router is entitled to keep the selected number for such use. For example, the receiving specified router compares respective router identifiers used to identify the routers in the network, and surrenders the link number to the other specified router if the other specified router has a numerically greater router identifier. If the other specified router is entitled to keep the selected number, the receiving router selects a new number for its link identifier, and repeats the process for the new number.

The above method achieves auto-configuration of unique network-layer addresses throughout the network region in a fully distributed fashion. Also, the segmentation of the addresses into distinct fields allows independent re-configuring at different levels in the network. For example, a region prefix assigned to a third field of the network-layer addresses of the nodes in the network region can be re-configure(d by a network service provider without the need to re-configure the link numbers. Likewise, the nodes on a link can be re-numbered without requiring the re-configuration of the link prefix.

Also disclosed is an address configuration technique that employs a centralized resource. According to this method, an centralized address-assigning node in the network region receives the request messages from the specified routers of the links, and assigns a region-wise unique link number to each link for which a request message has been received. Periodically, the address-assigning node generates link number assignment messages containing the assigned link numbers, and propagates the messages to the specified routers. Upon receiving a link number assignment message from the address-assigning node, each specified router assigns the link number from the message to the second field of the network-layer addresses of the nodes of the associated link.

In one embodiment, the request messages and link number assignment messages are conveyed using packets that are also used to carry out a link-state routing protocol. Both the request messages and the link number assignment messages are sent using a special multicast address to which all routers listen. This second method also achieves auto-configuration of link numbers for network addresses while relying on a centralized address-assigning authority. This method may be useful in circumstances in which the use of the distributed method is infeasible or otherwise undesirable.

Other aspects, features, and advantages of the present invention are disclosed in the detailed description that follows.

BRIEF DESCRIPTION OF THE SEVERAL VIEWS OF THE DRAWING

The invention will be more fully understood by reference to the following Detailed Description in conjunction with the Drawing, of which.

DETAILED DESCRIPTION OF THE INVENTION

Figure 1:
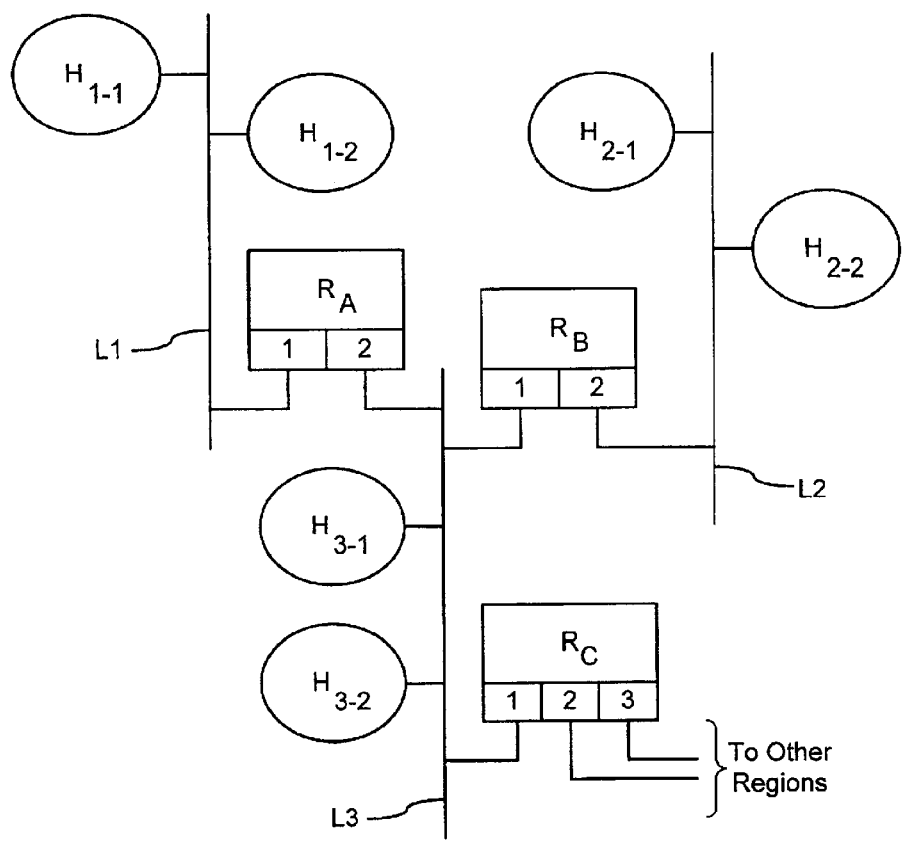
FIG. 1 is a block diagram of a network region consistent with the present invention.

An Internet Protocol (IP) network is partitioned into regions, each of which includes host computers or end nodes, routers, and links. Each link interconnects a subset of the nodes of the region. The links are interconnected by the routers. A simplified example of such an IP network region is shown in FIG. 1, and is described below.

For ease of description, in the illustrated case it is assumed that each link in the region is an Ethernet Local Area Network (LAN), and that each node has a unique 48-bit "media access control" (MAC) address. Uniqueness of Ethernet MAC addresses is guaranteed by a known administrative address-assigning process, which employs a single address-assigning authority. As described below, the disclosed methods rely on the ability to uniquely identify routers in a network region. This criterion can be met conveniently by using the MAC addresses in an Ethernet-only environment. In other environments, other methods may be used to uniquely identify the routers in a network region, such as allowing each router to simply choose an identifier at random from a very large identifier space.

The IP protocol is a network-layer or layer-3 communications protocol. Each network node has a layer-3 address, referred to as an IP address, which is used to identify the node as the source or destination of IP messages or "packets". IP routers execute a distributed routing program that is responsible for routing packets along paths from source nodes to one or more destination nodes, based on the IP addresses appearing in the packets and network topology information known to the routers. There are several types of routing programs. These include programs using a "distance vector" algorithm, such as the Routing Information Protocol or RIP, and programs using a "link state protocol", examples of which include the Intermediate System to Intermediate System (IS—IS) and Open Shortest Path First (OSPF) routing protocols. In the present description it is assumed that a link state routing protocol is operating. However, techniques described herein may be practiced in other routing environments, such as a RIP environment, as well.

Figure 2:
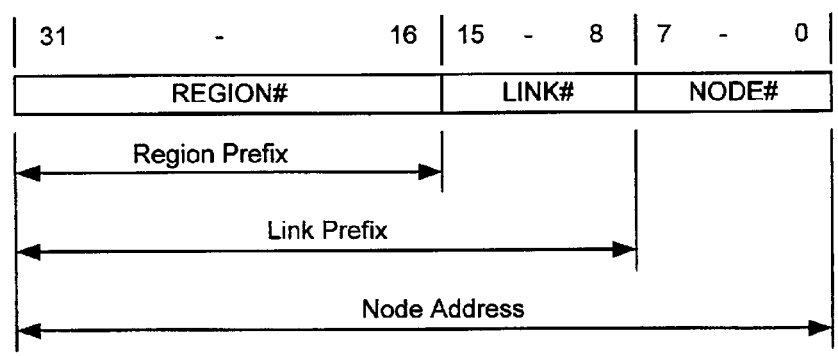
FIG. 2 is a diagram of the structure of a network-layer address in the network region of FIG. 1.

The process by which IP addresses are assigned to the various nodes of a region of an IP network is generally referred to as "address configuration". As described above, it is desirable that address configuration be as automatic as possible, to avoid the problems associated with manual configuration. To this end, the 32-bit IP addresses of the nodes of FIG. 1 are divided into three separate fields as shown in FIG. 2. A first field occupies the most signficant 16 bits, labeled bits 31–16. This field is referred to as a "region number", and defines an IP "region prefix" which uniquely identifies a region within a greater IP network. A second field occupies bits 15–8 and is referred to as a "link number". This field is concatenated with the region prefix to form a 3-byte IP "link prefix". The third field, occupying bits 7–0 and referred to as a "node number", is concatenated with the link prefix to form the complete node IP address.

Dividing the IP address into separate fields enables the address configuration task to be broken into three generally independent tasks, namely: (1) configuring a region prefix for each region in a network; (2) configuring a link number for each link in each region; and (3) configuring a node number for each node on each link. There are known algorithms by which a collection of nodes on a link auto-configure themselves with unique node numbers. Additionally, it is assumed for present purposes that an operator or some other means is relied upon to configure region prefixes and ensure that they are propagated to all the nodes of the region. The primary focus of the present description is the auto-configuring of the link number portion of the IP addresses by the routers in a region.

One router on each link is identified as a "specified router" or SR for purposes of the presently-disclosed auto-configuration protocol. The responsibilities of the SR on each link are to obtain a link number for the link and to inform the other nodes on the link of the obtained link number. The role of SR may be assigned in a variety of ways. For example, network regions using the OSPF or IS—IS routing protocols employ a special agent on each link called a "designated router" or DR, which is automatically selected according to a defined election process. It may be convenient to assign the SR role to the DR for the links in such a network region. However, the SR role may be assigned in different ways, as would be necessary for example in regions using routing protocols that do not employ a designated router. The SR may be automatically selected in a manner similar to the election process used in OSPF, or may simply be designated by a network operator or other means.

Once an SR has been established for each link, there are two different techniques that can be used to auto-configure the link number of each link in the region. In one technique referred to as the "centralized" technique, a single router in the region assigns the link numbers and informs the SRs of the link number assignments. For purposes of this description, this single router is referred to as the "address assignment router" or AAR. In another technique, referred to below as the "distributed" technique, the routers communicate among themselves in a fashion that enables the SRs to self-assign link numbers while guaranteeing their uniqueness within the region.

In the centralized technique, the AAR is first selected in some fashion. This can be done, for example, by causing each router to execute the well-known spanning tree algorithm to identify a "root node", to which the role of AAR is then assigned. Alternatively, in a link-state routing environment in which each router knows of identifier (ID) values for all of the other routers, the router whose ID meets a certain criterion (such as the highest ID value) can be declared the AAR. It is possible for the role of AAR to be transferred dynamically from one router to another. This operation is described below.

Each router acting as an SR for a link creates a "link name" that is used to uniquely identify the link for purposes of the auto-configuration protocol. In the assumed Ethernet-only region, a 7-byte link name is conveniently formed by concatenating a 6-byte MAC address associated with the SR and a one-byte value that uniquely identifies the link to the SR. This one-byte value may be, for example, a "port number" used within the SR to identify the port of the SR to which the link is connected. Note that the SR may have multiple MAC addresses, one for each link to which it is attached. In such a case, the SR may choose any of its MAC addresses to form the link name. In alternative embodiments, the local link identifier may be chosen in other ways, and may contain more or fewer bits as may be necessary and convenient.

The SR for each link then generates an address request message containing the link name, and sends this message to the AAR. For reasons discussed below, this message may also have a field for holding a "previous link name" value and a "present link number" value. In general, the message may be sent in either a unicast or a multicast manner. In a link-state routing environment, the message preferably takes the form of a link-state packet that is flooded to all routers.

The AAR receives the address request messages from all the SRs, assigns region-wise unique one-byte link numbers to the various links, and sends address assignment messages to the SRs to inform them of the link number assignments. The AAR maintains a table that associates each received 7-byte link name with a corresponding link number as assigned by the AAR. As described below, this list is updated dynamically in order to accommodate changes in the network, such as the initialization of new links, router outages, etc. If the network region has an excessively high number of links (in the illustrated embodiment more than 256), the AAR can become unable to fulfill address requests once all possible link numbers have been assigned. The nodes attached to a link for which a link number request has been denied are not able to communicate with nodes on other links, although they are still able to communicate among themselves. As a general matter, it is desirable that the number of links in a region be fewer than the maximum number of link numbers that can be assigned.

Preferably, the address assignment messages, generated by the AAR are multicast messages that are flooded throughout the region, although they can also be individually addressed unicast messages. If the messages are sent reliably (for example, as part of a link-state protocol), then it is necessary to send messages only when there is a change in the address assignment information. Otherwise, the messages can be sent at regular time intervals, for example.

Each address assignment message includes the contents of the above-described table, i.e., the set of pairings (link name, link number) created by the AAR. Each SR receives the address-assignment messages and extracts the link number paired with the 7-byte link name of each link for which the SR is responsible. The SR concatenates the one-byte link number with the 2-byte IP region prefix (FIG. 2) to create the 3-byte IP link prefix for the link. The SR maintains the link prefix in a routing database for use in the execution of the routing protocol. The SR also forwards the link prefix to all the other nodes on the link by periodic announcements or responses to queries, as is known in the art. Each node forms its complete IP address by concatenating its node number (configured by other means as discussed above) with the link prefix, and uses this address in carrying out the IP communications protocol.

An example is presented to illustrate the operation of the centralized technique. Referring to FIG. 1, a network region includes three Ethernet links L1, L2 and L3. Attached to link L1 are two host nodes $H_{1-1}$, $H_{1-2}$ and a router node $R_A$. Attached to link L2 are two host nodes $H_{2-1}$, $H_{2-2}$ and a router node $R_B$. Attached to link L3 are two host nodes $H_{3-1}$, $H_{3-2}$, the two router nodes $R_A$ and $R_B$, and another router node $R_C$. As shown, each router node has multiple ports, labeled "1", "2", etc., for connection to different links. Ports 2 and 3 of router $R_C$ are connected to unlabeled links assumed to be outside the region for purposes of auto-configuration.

As mentioned above, each node in the illustrated example has a unique MAC address. For purposes of this description, the values of the MAC addresses for the routers $R_A$, $R_B$, and $R_C$ are referred to symbolically as $MAC_A$, $MAC_B$, and $MAC_C$ respectively. It is further assumed that the roles of SR for the various links and the role of AAR are established as follows:

| Link 1 SR | $R_A$ |
|---|---|
| Link 2 SR | $R_B$ |
| Link 3 SR | $R_C$ |
| AAR | $R_A$ |

Each SR first forms a link name, in this example using port numbers as the one-byte local link identifiers. The results of these operations are as follows, where "|" indicates concatenation:

| Link | SR | Link Name |
|---|---|---|
| L1 | $R_A$ | $MAC_A|1$ |
| L2 | $R_B$ | $MAC_B|2$ |
| L3 | $R_C$ | $MAC_C|1$ |

Next, each SR forms an address request message including the respective link name, and sends the message to the AAR. The AAR performs the link number assignment according to an algorithm that guarantees that no link number is assigned to more than one link. For illustration purposes, it is assumed that the AAR creates the following link number assignments:

| Link Name | Link # |
|---|---|
| $MAC_A|1$ | 15 |
| $MAC_B|2$ | 26 |
| $MAC_C|1$ | 105 |

Finally, the AAR generates address assignment messages containing the link number assignments for all link names known to it, and broadcasts these messages throughout the region. When router $R_A$ sees a message containing the entry ($MAC_A|1$, 15), it concatenates the number 15 to the IP region prefix to yield an IP link prefix, and configures link L1 with this link prefix. It also forwards this link prefix to the hosts $H_{1-1}$ and $H_{1-2}$ for their use in forming an IP address as described above. Similar actions occur at routers $R_B$ and $R_C$, which use the values 26 and 105 respectively to form the link prefixes for links L2 and L3.

In order to promote stability in the link number assignments despite router outages and other events in the network, each address request message for a link preferably contains both the currently assigned link number (if any) and a value called the "previous link name" (if any). The currently assigned link number can be useful, for example, if the address configuration information has become lost at the AAR. In such a case, the AAR re-assigns the current link number (as contained in the request message) to the link name in the request message, and regenerates the pairing for the link in its address configuration database. The link number assigned to the link remains the same.

The previous link name is useful when a router assumes the role of SR from a router originally acting as the SR, which happens for example when the original SR suffers an outage. In this case, a pairing has already been established between a link number and a link name based on the MAC address of the original SR. To the AAR, however, a request from the new SR (containing a link name based on its MAC address) appears to be a request for a new link number. Before assigning a new link number, however, the AAR first determines whether a pairing already exists for the previous link name contained in the request. If such a pairing exists, the AAR changes the link name in the pairing to the new link name contained in the request, and includes this new pairing in its address assignment messages. Once the new SR receives an address assignment message containing the new pairing, it no longer needs to include the previous link name in its address request messages.

While the above-described technique employs the MAC addresses of the SRs to uniquely identify the links to the AAR, in alternative embodiments this unique identification may be achieved in other ways. For purposes of the auto-configuration protocol, the values used for link names need only distinguish among the links in a region. It may be convenient, for example, to employ codes that specify a manufacturer, model and serial number for each router, which combination is guaranteed to be unique for each router in a network.

It is possible for auto-configuration of IP addresses to be performed without the use of a central address-assigning authority such as the AAR. To do so, the SRs select link numbers for themselves and then communicate with each other to detect and resolve any conflicts in the selections. This technique is particularly suited to the link-state routing environment, in which all the routers are continually broadcasting and receiving link-state packets as part of the routing protocol. However, it is also adaptable to other routing environments as well.

Each SR maintains a database containing (link name, link number) pairings that are known to the SR from information in link-state packets received from other routers. When an SR requires a link number for an attached link, it selects one that is unassigned according to this database, and includes the selected link number in its link-state packets. Each SR continually monitors received link-state packets to determine whether another SR has selected the same link number. If such a condition is detected, then some priority criterion is evaluated to determine whether an alternative link number must be selected. For example, an SR may select another link number if the other SR has a numerically greater link name. Other algorithms for resolving conflicts in the selection of link numbers can also be used.

As previously mentioned, there must be some means by which region prefixes are made known to the nodes in a region. Generally, one or more routers exist at the "edge" of a region, meaning that they have at least one connection to the greater network of which the region is only a part. In the exemplary network region of FIG. 1, for example, router $R_C$ may serve as such an edge router. It may be convenient to provide a region prefix to such an edge router, for example by manual configuration, and enable the edge router to automatically disseminate the region prefix to the other nodes in the region. In a link-state routing environment, this dissemination can be accomplished using special link-state packets containing the assigned region prefix and a flag or other indication. The SR for each link can then inform the nodes on the link using a mechanism like that used to disseminate the link number.

Techniques for the auto-configuration of IP addresses have been described. It will be apparent to those skilled in the art that modifications to and variations of the above-described techniques are possible without departing from the inventive concepts disclosed herein. Accordingly, the invention should be viewed as limited solely by the scope and spirit of the appended claims.

What is claimed is:

1. In a network region having a plurality of links, each link including a plurality of nodes, one of the nodes of each link serving as a specified router responsible for certain communications in the network region on behalf of the link, a method for configuring the nodes with network-layer addresses, comprising:

for each node of each link, assigning a group-wise unique node number to a first field of the network-layer address of the node; and at the specified router of each of the links:
(i) receiving messages from the specified routers of the other links, the message from each specified router containing a number selected to be used as a region-wise unique link number for the associated link, and storing the received numbers in association with the respective links in a local database;
(ii) selecting a number to be used as a region-wise unique link number for the link in a second field of the network layer addresses of the nodes on the link, the selected number being a number not associated with another link in the local database; and
(iii) generating a message containing the selected number and propagating the message within the network region for receipt by the other specified routers.

2. A method according to claim 1, further comprising at the specified router for each of the links:
monitoring the messages received from the other specified routers to determine if another specified router has selected the selected number for use as a region-wise unique link number;
upon determining that another specified router has selected the selected number, evaluating a conflict-resolution criterion to determine whether the other specified router is entitled to keep the selected number for such use; and
upon determining that the other specified router is entitled to keep the selected number, repeating the selecting and generating for a different number.

3. A method according to claim 1, further comprising assigning a region number to a third field of the network-layer addresses of the nodes in the network region.

4. A method according to claim 1, wherein the specified routers participate in a link-state routing protocol within the network region, and wherein the messages are link-state packets.

5. A method according to claim 1, wherein each message includes a link name operative to uniquely identify the associated link in the network region.

6. A method according to claim 5, wherein the link name included in each message includes a link-layer address of the specified router for the associated link.

7. A method according to claim 6, wherein the link-layer address is a globally-unique media access control address.

8. A method according to claim 5, wherein the link name in each message further includes a port number identifying a port of the specified router to which the associated link is connected.

9. A method according to claim 1, wherein the specified router for each link is a selected one of one or more routers on the link.

10. A method according to claim 9, wherein for each link the routers engage in a distributed selection process by which the specified router is selected.

11. In a network region having a plurality of links, each link including a plurality of nodes, one of the nodes of each link serving as a specified router responsible for certain communications in the network region on behalf of the link, a method for configuring the nodes with network-layer addresses, comprising:

for each node of each link, assigning a link-wise unique node number to a first field of the network-layer address of the node;
at the specified router for each of the links, generating a request message identifying the associated link uniquely within the network region, and propagating the request message within the network region;
at an address-assigning node in the network region, (i) receiving the request messages from the specified routers of the links, (ii) assigning a region-wise unique link number to each link for which a request message has been received, (iii) generating link number assignment messages containing the assigned link numbers, and (iv) propagating the link number assignment messages to the specified routers; and
at the specified router of each link, receiving one of the link number assignment messages propagated by the address-assigning node and assigning the link number from the received link number assignment message to a second field of the network-layer addresses of the nodes of the link.

12. A method according to claim 11, further comprising assigning a region number to a third field of the network-layer addresses of the nodes in the network region.

13. A method according to claim 11, wherein the specified routers participate in a link-state routing protocol within the network region, and wherein the request messages are link-state packets.

14. A method according to claim 11, wherein each request message includes a link name operative to uniquely identify the associated link in the network region.

15. A method according to claim 14, wherein the link name included in each request message includes a link-layer address of the specified router for the associated link.

16. A method according to claim 15, wherein the link-layer address is a globally-unique media access address.

17. A method according to claim 15, wherein the link name in each request message further includes a port number identifying a port of the specified router to which the associated link is connected.

18. A method according to claim 11, wherein the specified router for each link is a selected one of one or more routers on the link.

19. A method according to claim 18, wherein for each link the routers engage in a distributed selection process by which the specified router is selected.

20. A method according to claim 11, wherein the address-assigning node is a selected one of the specified routers in the network region.

21. A method according to claim 20, wherein the specified routers engage in a distributed selection process by which the address-assigning node is selected.

22. A method according to claim 11, wherein the address-assigning node is operative to maintain a local database containing a plurality of entries, each entry associating a link number with a link to which the link number has been assigned, and wherein the address-assigning node is operative to assign a link number to a link only if the link number is not already assigned to another link as reflected in the entries of the local database.

23. A method according to claim 22, wherein each request message received by the address-assigning node contains a current link number assigned to the associated link, and wherein the address-assigning node is operative for each received request message to:

re-assign the current link number to the associated link if such an assignment does not conflict with any other link number assignments as reflected in the local database; and upon such re-assignment, add an entry for the re-assigned link number and associated link to the local database if such an entry is not already contained therein.

24. A method according to claim 11, wherein each request message includes (i) a current link name currently uniquely identifying the associated link in the network region, the current link name including a link-layer address of the current specified router for the associated link, and (ii) a previous link name, if existing, previously uniquely identifying the associated link in the network region, the previous link name including a link-layer address of a previous specified router for the associated link, and wherein the address-assignment node is operative for each received request message to determine whether a link number is already assigned to the link identified by the previous link name, and if so to re-assign the link number to the same link and associate the link number with the current link name.

25. A system for configuring nodes of a network region with network-layer addresses, the network region having a plurality of links, each link including a plurality of the nodes, the system comprising a plurality of specified routers each associated with a corresponding one of the links, the specified router associated for each link being operative to:
  (i) continually receive messages from the specified routers of the other links, the message from each specified router containing a number selected to be used as a region-wise unique link number for the link, and store the received numbers in association with the respective links in a local database;
  (ii) select a number to be used as a region-wise unique link number for the link in a second field of the network layer addresses of the nodes on the link, the selected number being a number not associated with another link in the local database and
  (iii) generate a message containing the selected number and propagate the message within the network region for receipt by the other specified routers.

26. A system for configuring nodes of a network region with network-layer addresses, the network region having a plurality of links, each link including a plurality of the nodes, comprising:
  a plurality of specified routers each associated with a corresponding one of the links, the specified router associated with each link being operative to (i) generate a request message identifying the associated link uniquely within the network region, and (ii) propagate the request message within the network region; and
  an address-assigning node in the network, the address-assigning node being operative to (i) receive the request messages from the specified routers of the links, (ii) generate link number assignment messages containing the assigned link numbers, and (iii) propagate the link number assignment messages to the specified routers;
  the specified router of each link being further operative to (i) receive one of the link number assignment messages propagated by the address-assigning node, and (ii) assign the link number from the received link number assignment message to a field of the network-layer addresses of the nodes of the link.

27. In a network region having a plurality of links, each link including a plurality of nodes, one of the nodes of each link serving as a specified router responsible for certain communications in the network region on behalf of the link, a method of operating the specified router associated with one of the links to configure the nodes of the link with network-layer addresses, comprising:
  (i) receiving messages from the specified routers of the other links, the message from each specified router containing a number selected to be used as a region-wise unique link number for the link, and storing the received numbers in association with the respective links in a local database;
  (ii) selecting a number to be used as a region-wise unique link number for the link, the selected number being a number not associated with another link in the local database; and
  (iii) generating a message containing the selected number and propagating the message within the network region for receipt by the other specified routers.

28. In a network region having a plurality of links, each link including a plurality of nodes, one of the nodes of each link serving as a specified router responsible for certain communications in the network region on behalf of the link, a method of operating the specified router associated with one of the links to configure the nodes of the link with network-layer addresses, comprising:
  generating a message identifying the link uniquely within the network region, and sending the request message to an address-assigning node in the network region; and
  receiving a link number assignment message from the address-assigning node, the link number assignment message containing a region-wise unique link number generated by the address-assigning node for the link, and assigning the link number from the received link number assignment message to a link number field of the network-layer addresses of the nodes of the link.

29. In a network region having a plurality of links, each link including a plurality of nodes, one of the nodes of each link serving as a specified router responsible for certain communications in the network region on behalf of the link, a method of operating an address-assigning node to configure each node in the network region with a link number portion of a network-layer address of the link, comprising:
  receiving messages from the specified routers of the links, each message identifying the associated link uniquely within the network region;
  assigning a region-wise unique link number to each link for which a request message has been received; and
  generating link number assignment messages and sending them to the specified routers, the link number assignment message sent to each specified router containing the link number assigned to the associated link.

30. A computer program product including a computer readable medium, the computer readable medium having an address configuration program stored thereon for execution in a computer functioning as a specified router for a link in a network region, the address configuration program comprising:
  (i) program code for receiving messages from the specified routers of the other links, the message from each specified router containing a number selected to be used as a region-wise unique link number for the link, and for storing the received numbers in association with the respective links in a local database;
  (ii) program code for selecting a number to be used as a region-wise unique link number for the link, the selected number being a number not associated with another link in the local database; and (iii) program code for generating a message containing the selected number and propagating the message within the network region for receipt by the other specified routers.

31. A computer program product including a computer readable medium, the computer readable medium having an address configuration program stored thereon for execution in a computer functioning as a specified router for a link in a network region, the address configuration program comprising:
program code for generating a message identifying the link uniquely within the network region, and for sending the request message to an address-assigning node in the network region; and
program code for receiving a link number assignment message from the address-assigning node, the link number assignment message containing a region-wise unique link number generated by the address-assigning node for the link, and for assigning the link number from the received link number assignment message to a link number field of the network-layer addresses of the nodes of the link.

32. A computer program product including a computer readable medium, the computer readable medium having an address configuration program stored thereon for execution in a computer functioning as an address-assigning node in a network region, the network region having a plurality of links each including a plurality of nodes, one of the nodes of each link serving as a specified router responsible for certain communications in the network region on behalf of the link, the address configuration program comprising:
program code for receiving messages from the specified routers of the links, each message identifying the associated link uniquely within the network region;
program code for assigning a region-wise unique link number to each link for which a request message has been received; and
program code for generating link number assignment messages and sending them to the specified routers, the link number assignment message sent to each specified router containing the link number assigned to the associated link.

33. A computer data signal embodied in a transmission medium including an address configuration program stored thereon for execution in a computer functioning as a specified router for a link in a network region, the address configuration program comprising:
(i) program code for receiving messages from specified routers of other links in the network region, the message from each specified router containing a number selected to be used as a region-wise unique link number for the associated link, and for storing the received numbers in association with the respective links in a local database;
(ii) program code for selecting a number to be used as a region-wise unique link number for the link, the selected number being a number not associated with another link in the local database; and
(iii) program code for generating a message containing the selected number and propagating the message within the network region for receipt by the other specified routers.

34. A computer data signal embodied in a transmission medium including an address configuration program for use in configuring nodes on a link in a network region with network-layer addresses, the address configuration program comprising:

program code for participating in assigning, for each node of the link, a link-wise unique node number to a first field of the network-layer address of the node;
program code for generating a request message identifying the associated link uniquely within the network region, and for propagating the request message within the network region; and
program code for receiving a link number assignment message from an address-assigning node in the network region, the link number assignment message containing a region-wise unique link number generated by the address-assigning node for the link, and for assigning the link number from the received link number assignment message to a second field of the network-layer addresses of the nodes of the link.

35. A computer data signal embodied in a transmission medium including an address configuration program for execution in a computer functioning as an address-assigning node in a network region, the network region having a plurality of links each including a plurality of nodes, one of the nodes of each link serving as a specified router responsible for certain communications in the network region on behalf of the link, the address configuration program comprising:
program code for receiving messages from the specified routers of the links, each message identifying the associated link uniquely within the network region;
program code for assigning a region-wise unique link number to each link for which a request message has been received; and
program code for generating link number assignment messages and sending them to the specified routers, the link number assignment message sent to each specified router containing the link number assigned to the associated link.

36. In a network region having a plurality of links, each link including a plurality of nodes, one of the nodes of each link serving as a specified router responsible for certain communications in the network region on behalf of the link, a system for configuring the nodes with network-layer addresses, comprising:
for each node of each link, means for assigning a group-wise unique node number to a first field of the network-layer address of the node; and
at the specified router of each of the links:
(i) means for receiving messages from the specified routers of the other links, the message from each specified router containing a number selected to be used as a region-wise unique link number for the link, and storing the received numbers in association with the respective links in a local database;
(ii) means for selecting a number to be used as a region-wise unique link number for the link, the selected number being a number not associated with another link in the local database; and
(iii) means for generating a message containing the selected number and propagating the message within the network region for receipt by the other specified routers.

37. In a network region having a plurality of links, each link including a plurality of nodes, one of the nodes of each link serving as a specified router responsible for certain communications in the network region on behalf of the link, system for configuring the nodes with network-layer addresses, comprising:
for each node of each link, means for assigning a link-wise unique node number to a first field of the network-layer address of the node;

means, at the specified router for each of the links, for generating a request message identifying the associated link uniquely within the network region, and for propagating the request message within the network region;

means, at an address-assigning node in the network region, for (i) receiving the request messages from the specified routers of the links, (ii) assigning a region-wise unique link number to each link for which a request message has been received, (iii) generating link number assignment messages containing the assigned link numbers, and (iv) propagating the link number assignment messages to the specified routers; and means, at the specified router of each link, for receiving one of the link number assignment messages propagated by the address-assigning node and for assigning the link number from the received link number assignment message to a second field of the network-layer addresses of the nodes of the link.

* * * * *